Sept. 29, 1931.         I. DOROGI ET AL         1,825,308
INFLATABLE HOLLOW RUBBER BODY
Filed Oct. 31, 1928
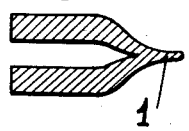
Fig. 1
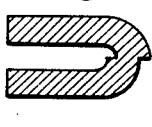
Fig. 2
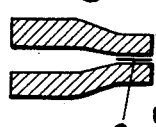
Fig. 3
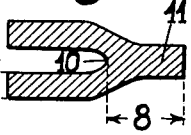
Fig. 4
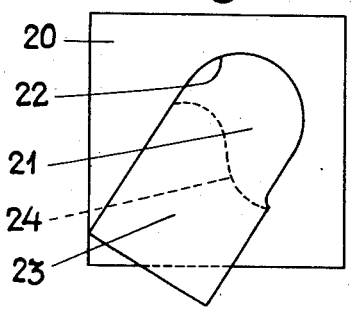
Fig. 5
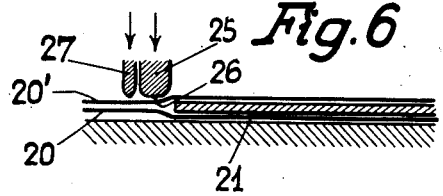
Fig. 6
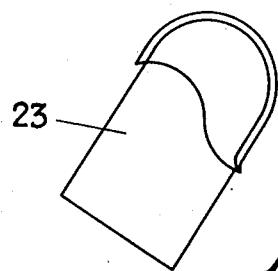
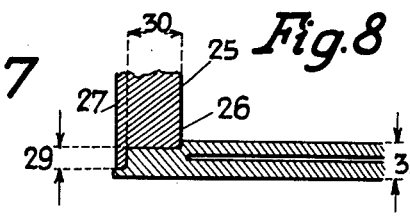
Fig. 8
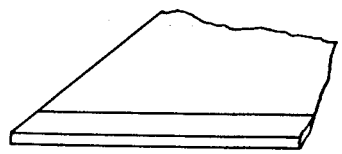
Fig. 7
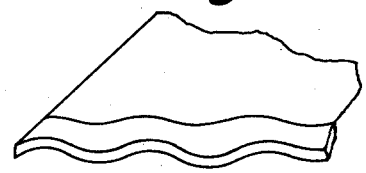
Fig. 9    Fig. 10
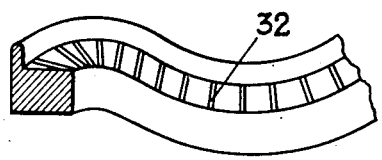
Fig. 11
Inventors
István Dorogi
Lajos Dorogi
by Steward & McKay
their attorneys Patented Sept. 29, 1931

1,825,308

UNITED STATES PATENT OFFICE

ISTVÁN DOROGI AND LAJOS DOROGI, OF BUDAPEST, HUNGARY, ASSIGNORS OF ONE-HALF TO DR. DOROGI ES TARSA GUMMIGYAR, R. T., OF BUDAPEST-ALBERTFALVA, HUNGARY, A LIMITED COMPANY OF HUNGARY

INFLATABLE HOLLOW RUBBER BODY

Application filed October 31, 1928, Serial No. 316,326, and in Austria September 15, 1928.

This invention relates to inflatable hollow rubber bodies and to a process for the production thereof.

The production of hollow bodies which are composed to separate thin rubber sheets and are flat in a deflated condition has hitherto entailed the disadvantage that the seams or ridges uniting the separate sheets to a hollow body were unreliable or costly to produce.

The accompanying drawings illustrate greatly enlarged and distorted cross-sections of such known seams and ridges. Fig. 1 shows a stamped seam. Inasmuch as in uniting the pieces by stamping with blunt tools, the dusting medium which prevents the surfaces of the sheets from sticking together, is not removed along the seam, but is only partially pressed into the rubber mass, said mass is contaminated just on the weld surface 1. It can be further seen from the drawings that the sheets to be united are greatly thinned at the seam owing to the displacing action of the blunt stamping tools on the caoutchouc material, so that the seam is always the weakest point of the article.

The conditions are similar when hammered seams are made by cutting two dusted sheets simultaneously and then hammering them together. When the sheets are cut simultaneously, a relative displacement of the sticky cross-sections of the two sheets, as exposed by the cut, becomes inevitable, so that, instead of the whole surface of the cross-section, only partial surfaces of the same become united during the subsequent hammering, as is shown in Fig. 2. The seams thus again become the weakest parts of the article.

With cemented seams (Fig. 3) the two edges of the sheet are not united direct in the seam as in the case of Fig. 2, but the union occurs through the intermediary of the adhesive layer 2 which also does not bear directly and with clean surfaces on the two edges of the sheets, but is contaminated on both sides by the dusting medium which originally covered the sheets. The resistance to tearing is smaller, for a given cross-sectional area, in the case of such cemented seams, than that of the welded seams according to Fig. 2. Moreover the formation of such seams is difficult and protracted.

The inflatable rubber articles made according to the invention are formed from two or more flat sheets which are welded together at their marginal surfaces and are hot vulcanized in the uninflated condition. These sheets are joined by a welded ridge shaped like a flat ribbon and formed solely of the rubber material of the united sheets, without intermediate adhesive or anti-adhesive material. This ridge has a cross section of substantially rectangular shape, having two approximately parallel sides, the width of the ridge being at least equal to one and one half times the thickness of the said ridge. The thickness of the ridge is less than double and is more than the single thickness of one of said sheets. Such a ridge is shown by way of example in Fig. 4. According to this figure, in a preferred embodiment of the invention the thickness of the ridge is not less than 1.2 times, and is not more than 1.7 times the thickness of one of the sheets united in the ridge. The resistance of such welded ridges to tearing is always greater than that of corresponding stamped seams made in any known manner. In fact, the resistance of such a ridge is greater than the strength of the article, so that the article is torn before the seam is opened.

As shown in Fig. 4 the thickness of the ridge 11 is at least 50% greater than the thickness of the sheet 9.

According to the invention, the manner in which such articles are made consists in superimposing sheets of raw rubber which are left—at least as regards the surfaces intended for the formation of the ridges—in the original sticky condition; and with the interposition of the medium intended to prevent the adhesion of the portions intended to form the walls of the article—which medium does not give off any gas or vapour at vulcanizing temperature—said sheets being united along the ridges by pressing and then hot vulcanized without a mould, in the uninflated, flat condition, before or after the removal of the surplus portions.

Figs. 1–3 inclusive of the accompanying drawings are greatly enlarged cross-sections of the known seams and ridges.

Fig. 4 is an enlarged cross-section of a welded ridge made according to the invention.

Fig. 5 illustrates the production of a bathing cap according to the invention.

Fig. 6 is a cross-section showing the rubber sheets, the template, and the stamping tool used to produce the article.

Fig. 7 illustrates the contour of the improved article.

Fig. 8 is a cross-sectional view showing a tool having a pressing surface and a stamping knife.

Fig. 9 shows a ridge formed with moderate pressure.

Fig. 10 shows a ridge formed with powerful pressure.

Fig. 11 illustrates the use of pressing surfaces having grooves or corrugations which are perpendicular to the seam line.

Accordingly, for the production of the articles according to the invention for example of a simple bathing cap, there is laid on a crude and therefore sticky rubber sheet 20 (Fig. 5), a paper or metal templet, the top edge 22 of which is of a shape corresponding to the ridge bottom 10 of the seam to be produced, whilst the lower part 23 of this templet extends beyond the outer contour line 24 of the cap to be produced. A second crude sheet of about the same size is then placed on top of the first sheet and the templet, and pressed on by means of elastic pressure, as a result of which the two crude sheets will stick together at the surfaces not separated from each other by the templet. Next, the sheets 20 and 20′ (Fig. 6) now already united by adhesion, will be pressed together, by a pressing tool 25, having a contour shape corresponding to line 22 (Fig. 5) the width of the pressing surface of which is at least 1½ times the thickness of one sheet, with such intensity as to stress the rubber sheets beyond their elastic limit and thus permanently displace a part of the rubber from the pressing area of the tool. In carrying out this operation it is advisable to use hot pressing tools. After this operation has been carried out, the edges of the sheet, which have not been subjected to pressure, are removed as waste by any method desired, for instance, by a stamping tool 27, so that the article now will present the contour shape shown in Fig. 7. It is subsequently hot vulcanized, the templet 23 being allowed to remain in the article during this process, or being previously removed. In the latter case the inner surfaces of the cap are of course dusted in the usual way.

The process can be varied within wide limits. Thus, for instance, instead of using templets, the sticking together of the inner surfaces of the article may be prevented by coating them, for instance, by printing, with solid or pasty anti-adhesive media, for instance, with a mixture of talc and glycerine, care being taken, of course, to preserve the original sticky condition of the surfaces intended to form the ridges.

The pressing of the ridge and the removal of the waste may also be effected simultaneously, e. g. by means of a tool as shown in Fig. 8 which embodies the pressing surface 26 as well as the stamping knife 27. The height 29 of the stamping edge is smaller than the double sheet thickness 31, whereas the width 30 of the pressing surface 26 is at least 1½ times the thickness of one single sheet.

It has been found that particular strength is imparted to the ridges produced in this manner, if in their production the pressure used in the pressing operation has been chosen high enough to cause the ridge not to lie flat any more in the plane of the united sheets after pressing and vulcanization, but to assume a more or less undulating shape. Fig. 9 gives a view of a moderately pressed, Fig. 10 that of a powerfully pressed ridge.

The tendency of the ridge to assume an undulated shape under high pressure, may be regulated, and at the same time, utilized for ornamental purpose, by using pressing surfaces (Fig. 11), which present, for instance, grooves 32 or corrugations running in a direction perpendicular to the seam line. In this case the pressing will not only cause the ridge to coalesce, but at the same time also to become corrugated; the height of the corrugation waves of the ridge will be greater than the depth of the grooves. It will be preferable to employ grooves the depth of which diminishes from the edge of the article towards the interior.

According to Figs. 6 and 8, a single tool may be employed for both pressing and corrugating, which tool will operate in conjunction with the solid supporting surface (table surface); if, however, a finer kind of corrugation is desired, two tools, working against each other, fitted with raised and depressed parts mutually covering each other, may also be employed.

What we claim is:

1. A distendable rubber article formed of a plurality of sheets of rubber coalesced along their edges to form a welded ridge, said sheets being welded together throughout the width of said ridge, said ridge projecting outwardly from the periphery of said article when the article is distended, the width of said ridge being not less than substantially one and one-half times the thickness of said ridge, the thickness of said ridge being less than the combined thicknesses of said sheets and exceeding the thickness of one of said sheets.

2. A distendable rubber article formed of a plurality of sheets of rubber coalesced along their edges to form a welded ridge, said sheets being welded together throughout the width of said ridge, said ridge projecting outwardly from the periphery of said article when the article is distended, the width of said ridge being not less than substantially one and one-half times the thickness of said ridge, the thickness of said ridge being not less than one and two-tenths times, and being not more than one and seven-tenths times the thickness of one of said sheets.

3. A distendable rubber article formed of a plurality of sheets of rubber coalesced along their edges to form a welded ridge, said sheets being welded together throughout the width of said ridge, said ridge having a substantially rectangular cross-section and projecting outwardly from the periphery of said article when the article is distended, the width of said ridge being not less than substantially one and one-half times the thickness of said ridge, the thickness of said ridge being less than the combined thicknesses of said sheets, the thickness of said ridge exceeding the thickness of one of said sheets.

In testimony whereof we affix our signatures.

ISTVÁN DOROGI.
LAJOS DOROGI.